(12) United States Patent
Sohma (10) Patent No.: US 12,476,551 B2
(45) Date of Patent: Nov. 18, 2025

(54) SWITCHING POWER SUPPLY CIRCUIT

(71) Applicant: Shohtaroh Sohma, Osaka (JP)

(72) Inventor: Shohtaroh Sohma, Osaka (JP)

( * ) Notice: Subject to any disclaimer, the term of this patent is extended or adjusted under 35 U.S.C. 154(b) by 201 days.

(21) Appl. No.: 18/384,454

(22) Filed: Oct. 27, 2023

(65) Prior Publication Data

US 2024/0154536 A1    May 9, 2024

(30) Foreign Application Priority Data

Nov. 7, 2022    (JP) .................. 2022-178185

(51) Int. Cl.
H02M 3/335 (2006.01)
H02M 1/00 (2006.01)
H02M 1/42 (2007.01)

(52) U.S. Cl.
CPC ..... H02M 3/33592 (2013.01); H02M 1/0058 (2021.05); H02M 1/4241 (2013.01)

(58) Field of Classification Search
CPC ........... H02M 3/33592; H02M 1/0058; H02M 1/4241
See application file for complete search history.

(56) References Cited

U.S. PATENT DOCUMENTS

| | | | | |
|---|---|---|---|---|
| 8,836,300 | B2* | 9/2014 | Sohma ................. | H02M 3/1588 323/272 |
| 2023/0179117 | A1* | 6/2023 | Ren ................... | H02M 3/33571 363/131 |
| 2025/0141359 | A1* | 5/2025 | Shen ................... | H02M 1/0035 |

FOREIGN PATENT DOCUMENTS

JP    6643423 B    2/2020

OTHER PUBLICATIONS

[Non-patent Document 1] Hari, A., McCoy, B., "High-Density Ac-Dc Power Supplies using Active-Clamp Flyback Topology", Semiconductor Components Industries, LLC, Oct. 2019, 2021—Rev. 5 1 Publication Order Number: TND6279JP/D; no later than Oct. 31, 2019.

[Non-patent Document 2] Texas Instruments Inc., "Zero-Voltage-Switching Flyback Using UCC28780 Controller and UCC5304 Isolated Synchronous-Rectifier Driver", Jul. 2020; no later than Jul. 31, 2020.

(Continued)

*Primary Examiner* — Adolf D Berhane
(74) *Attorney, Agent, or Firm* — Ogilvie Law Firm (57) ABSTRACT

An isolated switching power supply circuit is compact, high-efficiency, and low noise. It includes a transformer T1 which has a primary winding wound with NP turns and a secondary winding wound with NS turns, a drive switch Q1 and an active clamp switch Q2 configuring a primary side half-bridge, a boost capacitor CBULK1 that charges a discharge energy of the transformer, rectifier diodes D1 and D2 connected in series, a tank capacitor CT1, and an output capacitor COUT1. A secondary side winding voltage, when the drive switch Q1 or the active clamp switch Q2 is on, is held in the tank capacitor CT1, and by superimposing the secondary winding voltage, when the drive switch Q1 or the active clamp switch Q2 is off, on the voltage held in the tank capacitor CT1, the configuration is such that output voltage VOUT equals boosted voltage VBULK times (NS divided by NP).

16 Claims, 8 Drawing Sheets

(56) References Cited

OTHER PUBLICATIONS

[Non-patent Document 3] Kali Naraharisetti, Janamejaya Channegowda, "Single Stage PFC Flyback AC-DC Converter Design", 2020 IEEE International Conference on Electronics, Computing and Communication Technologies, Jul. 2-4, 2020; no later than Jul. 4, 2020.
[Non-patent Document 4] Texas Instruments Inc., "UCC28780 High Frequency Active Clamp Flyback Controller", SLUSD 12A—Oct. 2017—Revised, Feb. 2018; no later than Feb. 28, 2018.

\* cited by examiner

SWITCHING POWER SUPPLY CIRCUIT

RELATED APPLICATION

The present application claims priority to, and incorporates by reference the entirety of, Japanese patent application 2022-178185 filed 7 Nov. 2022.

TECHNICAL FIELD

The present invention relates to a switching power supply circuit of an active clamp system.

BACKGROUND

Typical flyback converters are designed to dissipate the energy stored in a leakage inductor with an RCD snubber, and this loss increases in proportion to the switching frequency, thereby hindering the downsizing of the device at higher frequencies. Also, a ringing of a switch node at high frequencies due to leakage inductors causes noise and hinders the downsizing of the input filters.

To solve these problems, switching power supply circuits with active clamp flyback have been proposed (e.g., Patent Document 1 or Non-Patent Document 1).

One feature of active clamp flyback is that the energy stored in the leakage inductor is not dissipated by an active clamp switch, which charges the clamp capacitance with the energy stored in the leakage inductor and discharges it during power transfer to the secondary side. This makes it possible to reduce the loss proportional to the switching frequency of the leakage inductor and to increase the frequency.

Also, the switch node is clamped to the clamping capacitance, which is effective in reducing noise without ringing.

Furthermore, by optimizing the control of active clamp switches through the development of control ICs, it has become possible to realize ZVS (Zero Voltage Switching) using the reverse current of the magnetizing inductor, thereby significantly reducing the loss and noise associated with switching.

These effects make it possible to configure compact, high-efficiency, low-noise switching power supplies by reducing the sizes of the transformers and filters.

SUMMARY OF THE INVENTION

Problems to be Solved by the Invention

However, even in an active clamp flyback, the secondary side switching node has the same configuration as in a typical flyback converter, so ringing of the switch node occurs.

Figure 1:
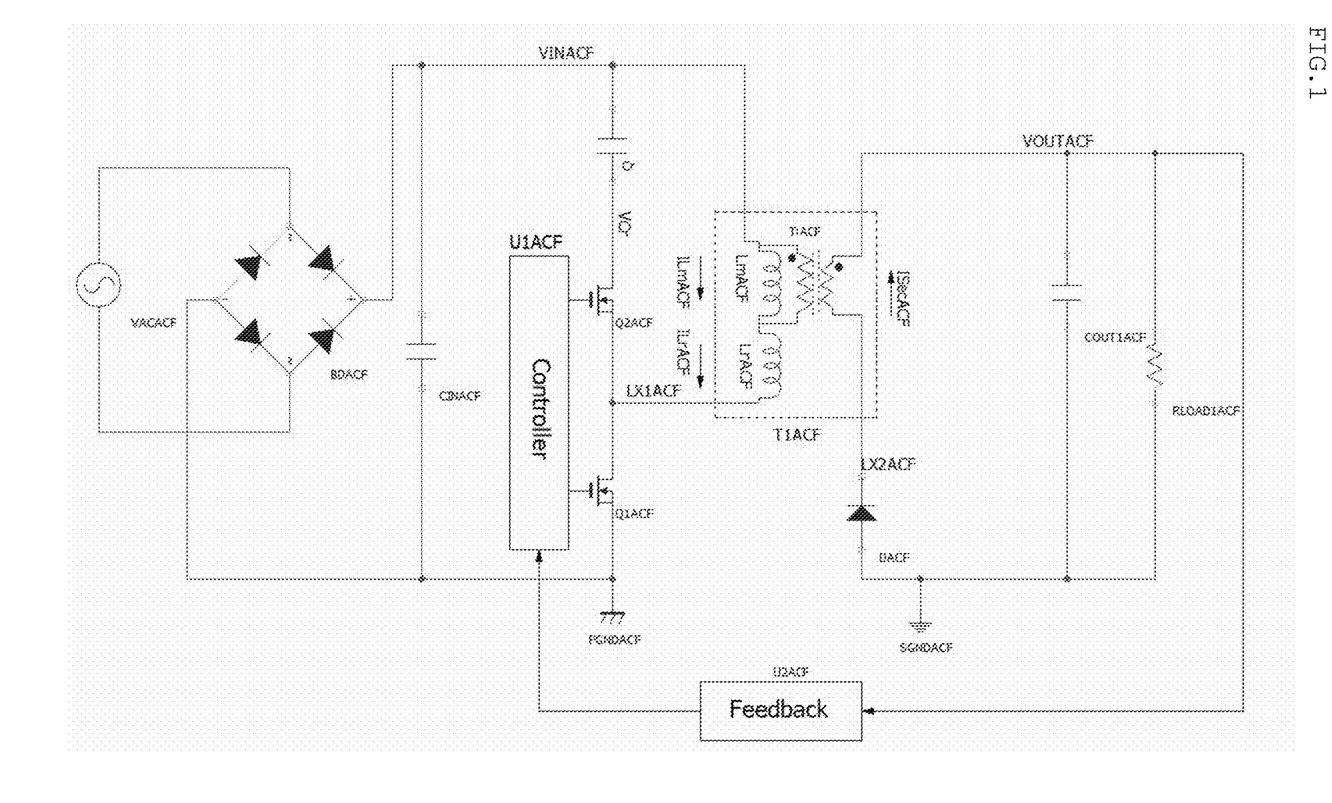
FIG. 1 shows a circuit diagram of a typical active clamp flyback.

FIG. 1 shows an example of a circuit diagram for a typical active clamp flyback.

An AC voltage input from an AC power supply VACACF is converted to a DC voltage VINACF using a bridge diode BDACF, and the output voltage VOUTACF is output to an isolated secondary side via a transformer. A control circuit U2ACF outputs an isolated feedback signal to a control circuit U1ACF, and based on the feedback signal, the control circuit U1ACF operates a drive switch Q1ACF and an active clamp switch Q2ACF in a complementary manner to control the output voltage VOUTACF to the desired voltage. An input capacitor CINACF is used to maintain the input voltage. A transformer T1ACF is expressed as a model consisting of an ideal transformer TrACF, an exciting inductor LmACF, and a leakage inductor LrACF for the purpose of explanation below. Also, primary winding:secondary winding ratio is NP:NS.

Figure 2:
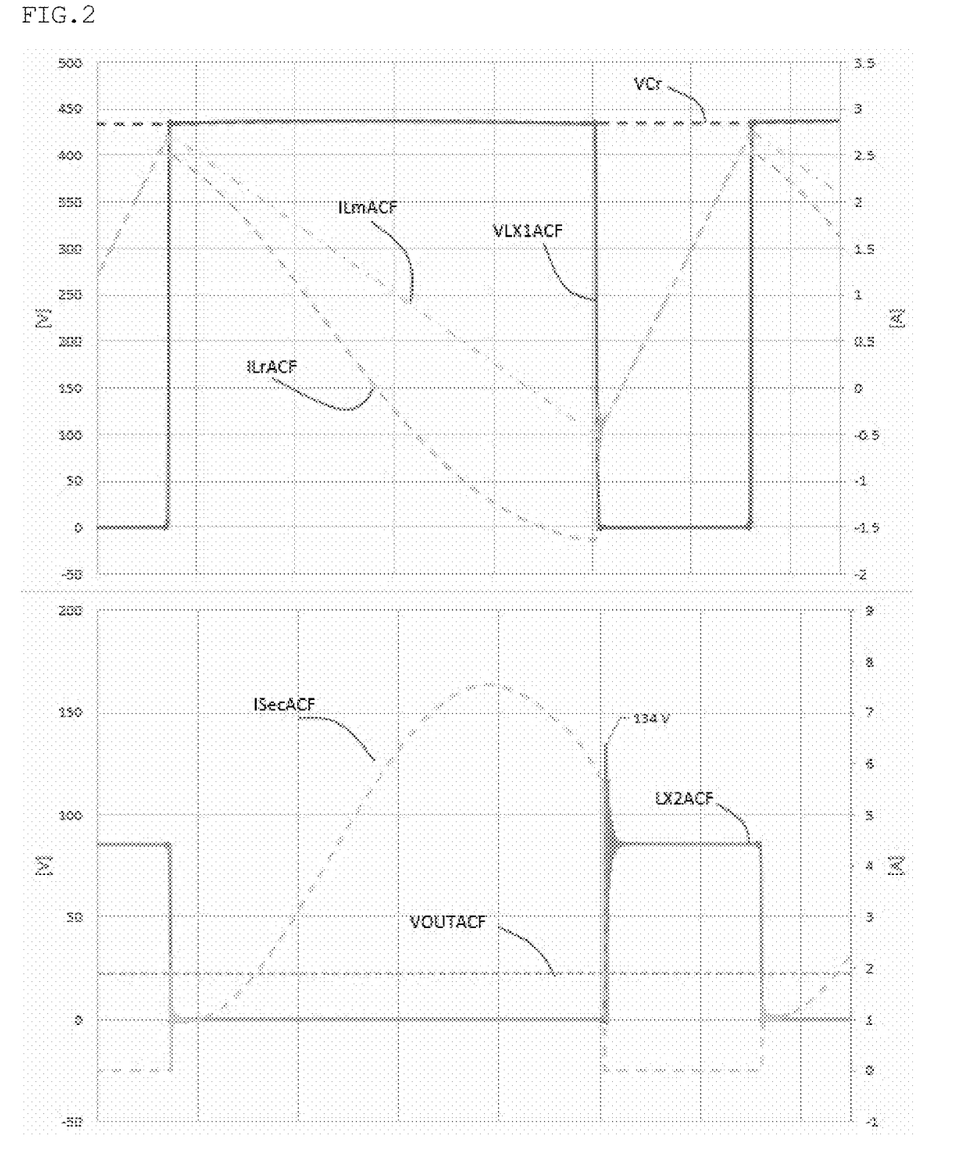
FIG. 2 shows an operating waveform diagram of an active clamp flyback shown in FIG. 1.

FIG. 2 shows the voltage and current waveforms at NP:NS=5:1 as shown in FIG. 1. From FIG. 2, the amplitude of ringing becomes large when a secondary side switch node voltage LX2ACF increases; for example, for a 20 V output converter, a withstand voltage of 100 V to 150 V is required for a rectifier diode DACF. Noise due to large amplitude and ringing is also a problem; therefore, noise suppression components are required.

Means to Solve the Objects

In order to solve the above-mentioned problems, the present invention includes the following configuration.

A switching power supply circuit of the present invention includes:
- a transformer with a primary winding and a secondary winding,
- a driver switch to drive the transformer,
- an active clamp switch that clamps a primary side switch node when the driver switch is turned off,
- a bulk capacitor to discharge clamp energy,
- a first rectifier,
- a second rectifier,
- a tank capacitor,
- an output capacitor,
- a feedback circuit that outputs a feedback signal in response to an output voltage, and
- a control circuit that controls the driver switch and the active clamp switch based on the feedback signal, and
wherein the primary side switch node is clamped to a positive or negative electrode of the bulk capacitor via the driver switch or the active clamp switch and a secondary side switch node is clamped to a positive or negative electrode of the output capacitor via the first rectifier or the second rectifier, and wherein the output voltage becomes a voltage corresponding to the ratio of the number of turns of the primary winding and the number of turns of the secondary winding of the bulk capacitor voltage.

Effects of the Invention

According to the present invention, it is possible to provide an isolated switching power supply that is compact, highly efficient, and low noise, and can operate over a wide input voltage range.

Examples of the present invention are described in detail below with reference to the drawings.

DETAILED DESCRIPTION

Next, modes for carrying out the present invention are described using examples.

Example 1

Figure 3:
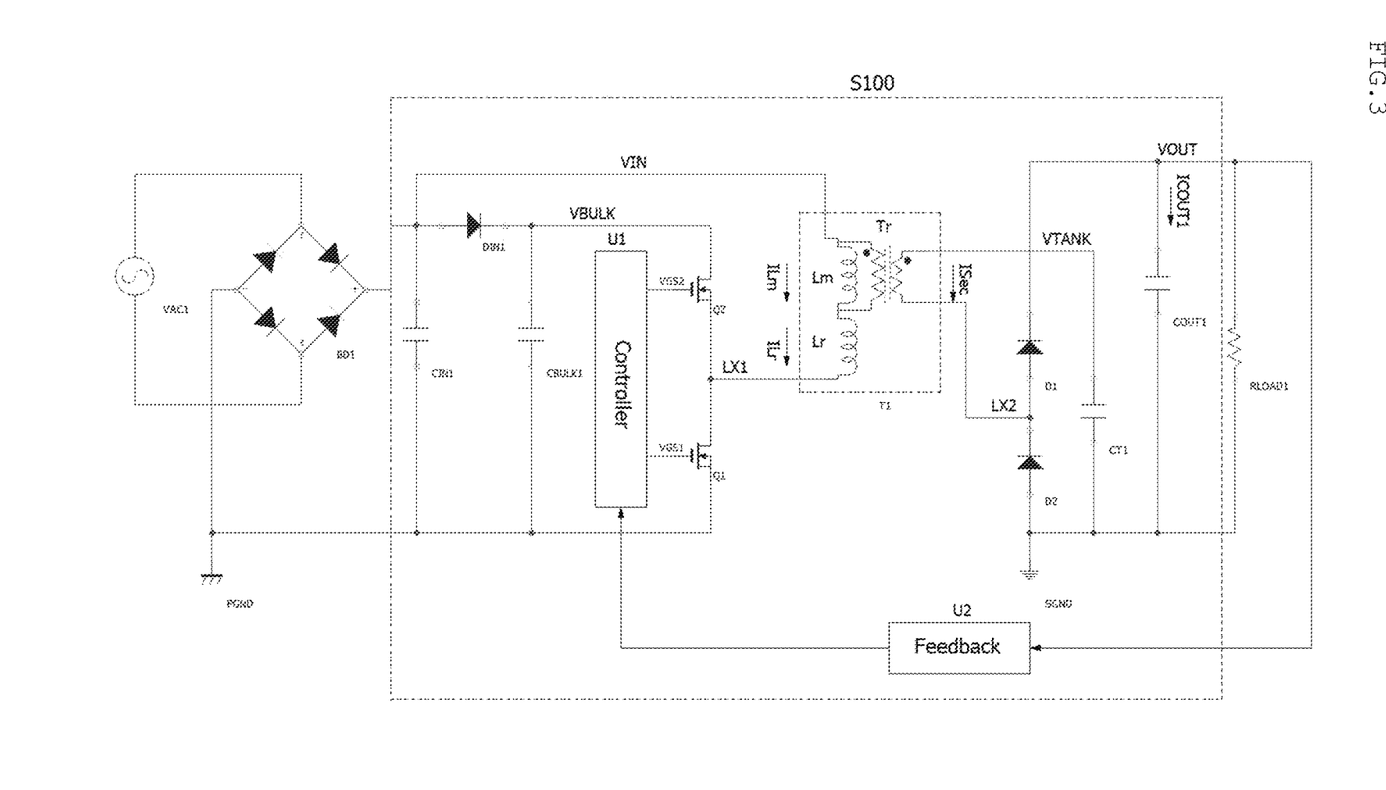
FIG. 3 shows a circuit diagram of Example 1.

First, an example of the present invention will be described using FIG. 3. The switching power supply circuit S100 outputs an output voltage VOUT to the isolated secondary side via a transformer from an input voltage VIN, which is a DC voltage obtained by converting the AC voltage input from the AC power supply VAC1 using the bridge diode BD1. The feedback circuit U2 outputs an isolated feedback signal to the control circuit U1, and based on the feedback signal, the control circuit U1 controls the output voltage VOUT to a desired voltage by operating the drive switch Q1 and the active clamp switch Q2 in a complementary manner. The input capacitor CIN1 is used for temporarily holding the input voltage. The bypass diode DIN1 is used for charging CBULK such that the boost voltage VBULK becomes the input voltage VIN when the input voltage VIN is higher than the boost voltage VBULK. The transformer T1 is represented by a model composed of the ideal transformer Tr, the exciting inductor Lm, and the leakage inductor Lr for the purpose of explanation below. Also, the primary winding:secondary winding ratio is NP:NS.

Figure 4:
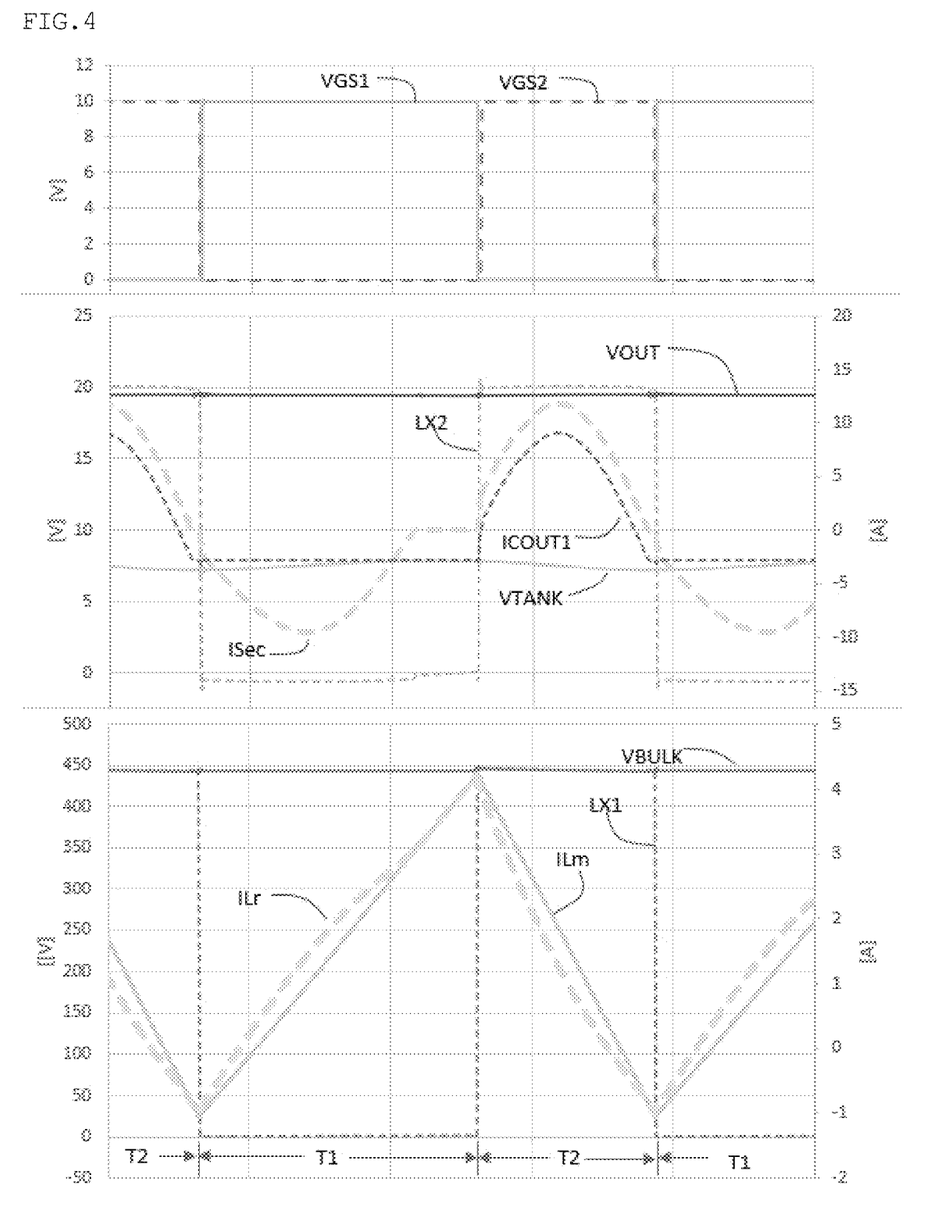
FIG. 4 shows an operational waveform diagram of Example 1 in FIG. 3.

The operation of this example is further described in detail using the operating waveform shown in FIG. 4.

Regarding period T1: The Period T1 starts with the drive switch Q1 turning on when the primary side switch node voltage LX1 is low. Therefore, since the Vds of the drive switch Q1 is zero voltage, the drive switch Q1 becomes zero voltage switching (ZVS). Since the drive switch Q1 is ON, energy is accumulated in the transformer T1 and the magnetizing current ILm increases. Since the input voltage VIN is applied to the primary winding, a voltage equal to the input voltage VIN×NS/NP is generated in the secondary winding by the ideal transformer Tr. Since the secondary side switch node voltage LX2 is clamped to the secondary side reference voltage SGND by the rectifier diode D2, the tank capacitor CT1 is charged with a voltage equal to the input voltage VIN×NS/NP.

Also, the tank capacitor CT1 is charged by the secondary side rectified current ISec. The output capacitor COUT1 discharges the output capacitor current ICOUT1 to the load RLOAD1 in order to hold the output voltage VOUT. Then, the primary side switch node voltage LX1 transitions to high owing to the magnetizing current ILm as the drive switch Q1 is turned off, and the primary side switch node voltage LX1 is clamped to the boost voltage VBULK through the body diode of the active clamp switch Q2.

Regarding period T2: The period T2 starts with the active clamp switch Q2 turning on when the primary side switch node voltage LX1 is high. Therefore, since the Vds of the active clamp switch Q2 is zero voltage, the active clamp switch Q2 becomes zero voltage switching (ZVS). Since the active clamp switch Q2 is ON, the resonant current ILr flows to the boost capacitor CBULK1, which charges and discharges. What is important here is that if the active clamp switch Q2 is not an active clamp but a diode, discharge, that is, negative current cannot flow. If discharge is not possible, the boosted voltage VBULK has no choice but to continue to increase, eventually reaching the breakdown voltage of each element. However, since the active clamp switch Q2 is an active clamp, it is possible to discharge the energy of the leakage inductor Lr, and it is possible to efficiently transmit that energy to the secondary side.

Since (boost voltage VBULK−input voltage VIN) is applied to the primary winding, a voltage of (boost voltage VBULK−input voltage VIN)×NS/NP is generated by the ideal transformer Tr in the secondary winding. The secondary side switch node voltage LX2 is clamped to the output voltage VOUT by the rectifier diode D1. The tank capacitor CT1 is charged with the voltage of the input voltage VIN×NS/NP at transformer T1, so the output voltage VOUT is charged with the voltage of the tank capacitor CT1 superimposed on the secondary winding voltage, (boost voltage VBULK−input voltage VIN)×NS/NP, of the ideal transformer Tr. In other words, output voltage VOUT=input voltage VIN×NS/NP+(boost voltage VBULK−input voltage VIN)×NS/NP=boost voltage VBULK×NS/NP, and the output voltage VOUT is generated at a voltage of the winding ratio of the boost voltage VBULK.

Also, the output capacitor COUT1 is charged by the secondary side rectified current ISec. The output capacitor current ICOUT1, which is the difference between the discharging current to the load RLOAD1 and the charging current due to the secondary side rectified current ISec, flows to the output capacitor COUT1.

After that, when the magnetizing current ILm becomes a negative current, the active clamp switch Q2 turns off and the primary side switch node voltage LX1 is transitioned low by the magnetizing current ILm and clamped to GND via the body diode of the drive switch Q1.

Note that the magnetizing current ILm is not output outside the transformer and cannot be monitored directly. To solve this problem, an IC with adaptive control (see Non-Patent Document 4, Section 7.4.1), which is used in TI's (Texas Instruments Inc.) UCC28780 and ONSEMI's NCP1568, can be used as the control circuits U1. It is possible to adjust an ON time of the active clamp switch Q2 and control the negative current of the magnetizing current ILm to an optimal value for the drive switch Q1 to operate as ZVS.

Also, the essential problem of this example is that when the boosted voltage VBULK is lower than the input voltage VIN, the boosted voltage VBULK must be set higher than input voltage VIN, because the boosted voltage VBULK is increased to the input voltage VIN via the bypass diode DIN1 or the body diode of the active clamp switch Q2.

For example, if the AC power supply voltage in this example is in the range of 100 VAC to 240 VAC, the input voltage VIN is 240V×√2≈340V at maximum. Therefore, the boost voltage VBULK needs to be set to 340V or higher.

From the above description of the operation, the following points are clear.

The active clamp switch Q2 charges the energy stored in the leakage inductor Lr to the boost capacitor CBULK1 and discharges it during the power transfer to the secondary side, thereby not dissipating the energy stored in the leakage inductor Lr. Also, the drive switch Q1 and the active clamp switch Q2 are always in ZVS mode, which significantly reduces the losses and noise associated with the switching. These effects are equivalent to those of active clamp flyback.

Furthermore, since the secondary side switch node voltage LX2 is clamped by the rectifier diodes D1 and D2, unnecessary ringing does not occur.

Also, the amplitude of the secondary-side switch node voltage LX2 is the voltage between the output voltage VOUT and the secondary side reference voltage SGND; so for example, if the output voltage is 20V, the amplitude is 20V, which is approximately ⅕ lower than the 100V to 150V that occurs in active clamp flyback. Therefore, noise is further reduced by these factors. Therefore, the elements required for noise reduction, which are not shown in the drawings, are not necessary or can be made smaller, thus enabling the downsizing of the power supply.

Also, since the withstand voltage required for the rectifier diode DACF is 100V to 150V, whereas the withstand voltage required for the rectifier diode D1 and the rectifier diode D2 is 20V, therefore, it is possible to use devices with high level characteristics such as compact size, low breakdown voltage, high-speed, and low cost.

Also, the winding ratio of the active clamp flyback with a 20V output is approximately NP:NS=5:1 (see section 6.4 of page 8 of Non-Patent Document 2). On the other hand, in this example, when the boost voltage VBULK is set to 400V, output voltage VOUT=boost voltage VBULK×NS/NP, so becomes NS/NP=output voltage VOUT/boost voltage VBULK=20/400, and becomes NP:NS=20:1. This means that the number of secondary windings can be reduced to ¼ when the number of primary windings is the same in active clamp flybacks. For example, in the active clamp flyback, if the primary winding has 20 turns, the secondary winding will have 4 turns.

On the other hand, in this example, if the primary winding has 20 turns, the secondary winding can be wound with 1 turn in 4 parallel. In other words, the secondary winding resistance becomes ¼×¼=1/16, leading to low loss and high efficiency. Alternatively, transformer T1 can be downsized by making the secondary winding 1 turn in 1 parallel.

As can be seen from the above, in this example, it is possible to configure a switching power supply that is even smaller, more efficient, and less noisy than the active clamp flyback.

Example 2

Figure 5:
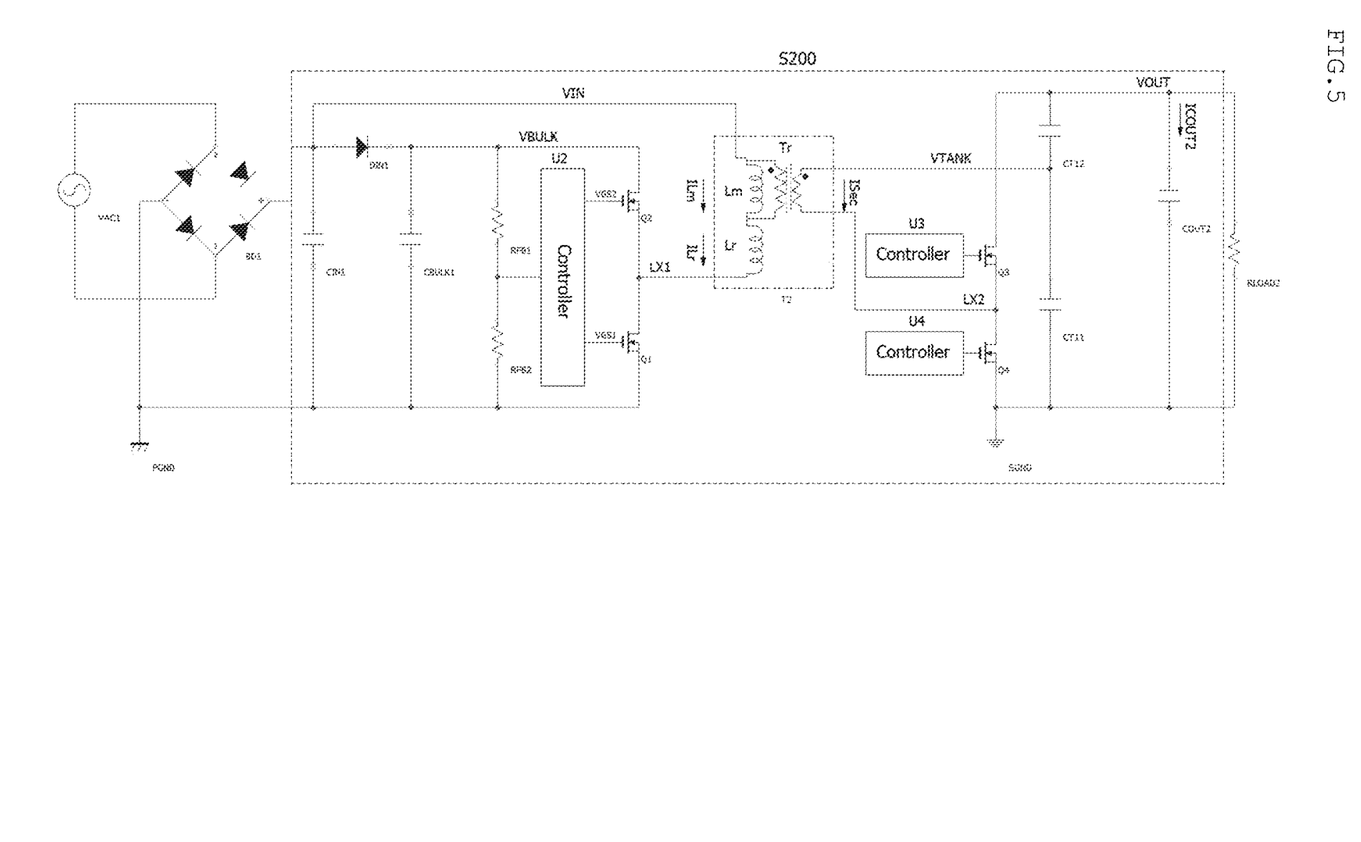
FIG. 5 shows a circuit diagram of Example 2.

Different circuit configurations of the example of the present invention will be explained using FIG. 5.

Example 2 differs from Example 1 in the following points: the feedback circuit U2 is replaced by a feedback resistor RFB1 and a feedback resistor RFB2; the rectifier diode D1 and D2 are replaced by ideal diodes composed of a synchronous rectifier switch Q3, a synchronous rectifier switch Q4, a synchronous rectifier switch control circuit U3, and a synchronous rectifier switch control circuit U4; and a tank capacitor CT12 is added in addition to the tank capacitor CT11.

Generally, to configure the feedback circuit U2 that straddles the insulation, semiconductors such as photocouplers and shunt regulators, and an RC network to ensure stability are required. However, as described in Example 1, the output voltage VOUT=boosted voltage VBULK×NS/NP, and NS/NP is a design value, therefore a known fixed value. Therefore, when NP:NS=20:1 as in Example 1, if the boosted voltage VBULK is controlled at 400V, the output voltage VOUT becomes 20V.

Thus, unless variations in the winding ratio of the transformer are taken into consideration, it is not necessary to feedback from the secondary side, and the boosted voltage VBULK should be treated as a feedback signal. Generally, since circuits that receive feedback signals are composed of low breakdown voltage elements, FIG. 5 shows an example in which the voltage is divided into a voltage that does not exceed the element breakdown voltage using feedback resistors RFB1 and RFB2. This eliminates the need for the feedback circuit U2, which enables a smaller board and lower cost.

Also, in Example 1, since the rectifier diode D1 and D2 are diodes, a forward voltage Vf is generated during rectification, and a loss of the forward voltage Vf×secondary side rectification current ISEC occurs. This is a non-negligible loss compared to the total loss of the converter. By replacing the rectifier diode D1 with the synchronous rectifier switch control circuit U3 and the synchronous rectifier switch Q3, and replacing the rectifier diode D2 with the synchronous rectifier switch control circuit U4 and the synchronous rectifier switch Q4, the loss during rectification is expressed as Ron×ISEC^2 using the on-resistance Ron of synchronous rectification switch Q3 and synchronous rectification switch Q4 and the secondary rectification current ISEC.

This is also true for the active clamp flyback, but in the active clamp flyback, for example, if an output voltage is 20 V, an element withstand voltage of approximately 100 V to 150 V is required. On the other hand, in the present invention, the synchronous rectification switches Q3 and Q4 only need to have the element withstand voltage of approximately 20V, and it is possible to use devices with high level characteristics such as compact size, low on-resistance, high-speed, and low cost.

Also, in Example 1, since the output capacitor COUT1 is charged only during the period T2, a non-charging period is long, and the charging current of the output capacitor COUT1 is large. Since the output capacitor COUT1 is a smoothing capacitor, a capacitance of several hundred microfarads is required, and a polymer solid electrolytic capacitor is used. The polymer solid electrolytic capacitor has a large ESR (equivalent series resistance), with a resistance value ranging from tens to hundreds of mΩ, so losses due to ESR cannot be ignored.

In contrast, in Example 2, since the tank capacitor CT12 is added between the output voltage VOUT and the tank capacitor voltage VTANK, a resonant current can flow to the output capacitor COUT2 via the tank capacitor CT11 and CT12 in periods T1 and T2.

Figure 6:
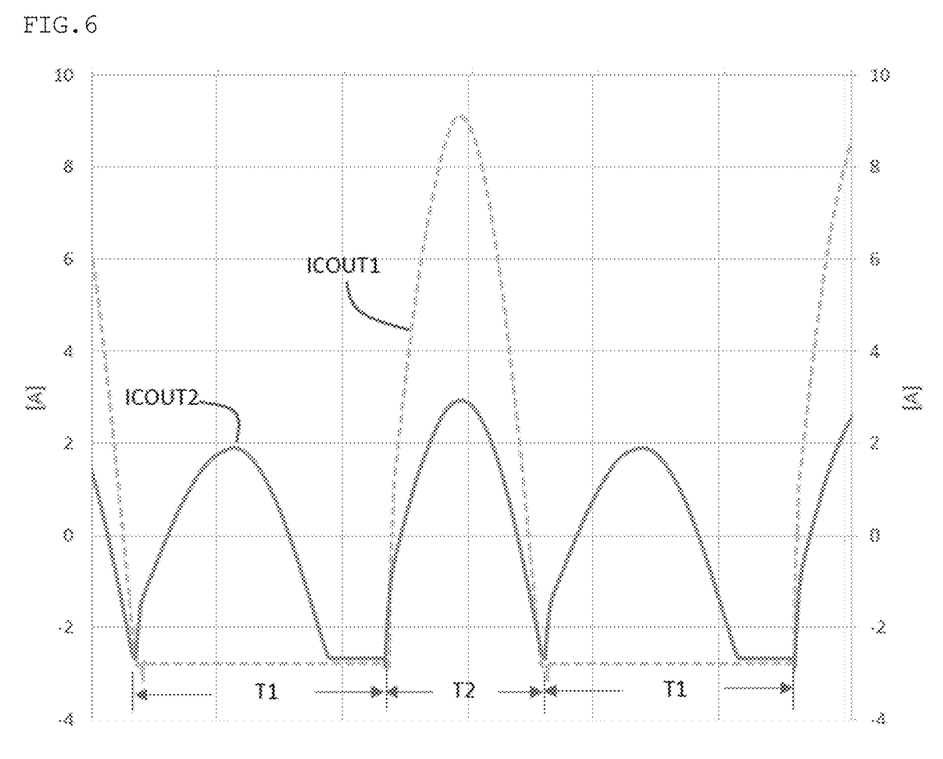
FIG. 6 shows an operating waveform diagram of Example 2 in FIG. 5.

FIG. 6 shows comparison waveforms of the output capacitor current ICOUT1 and the output capacitor current ICOUT2 for the output capacitor COUT1 and the output capacitor COUT2 in Examples 1 and 2, respectively.

In Example 2, as in Example 1, the tank capacitor CT11 is charged in the period T1, and at the same time, a part of the resonant current is charged to the output capacitor COUT2 via the tank capacitor CT12. Also, in the period T2, the tank capacitor CT12 is charged, and at the same time, a part of the resonant current is charged to the output capacitor COUT2 via the tank capacitor CT11.

As can be seen from the waveform, in FIG. 6, the charging/discharging current flowing to the output capacitor COUT2 becomes smaller, so it is possible to reduce the loss due to ESR.

Also, since the tank capacitor CT11 and the tank capacitor CT12 are resonant capacitors, their capacitance values may be small, and ceramic capacitors can be used. The ESR of ceramic capacitors is very much lower than that of polymer solid electrolytic capacitors (approximately several mΩ). Therefore, it is possible to reduce losses and achieve even higher efficiency.

Furthermore, since the ripple voltage generated at each switching frequency of the output voltage VOUT can be reduced by reducing the charging/discharging current, the capacitance of the output capacitor COUT2 can be reduced. Therefore, further downsizing of the device is possible.

Example 3

It is known that a single-stage PFC can be configured by using a flyback or an active clamp flyback as a PFC (power factor correction circuit) (see Non-Patent Document 3).

The converter according to the present invention can likewise be modified to a single-stage PFC. The controller in Example 1 or Example 2 is simply modified to one having a power factor correction function based on fixed on-time control, or one having a power factor correction function based on a multiplier.

Figure 7:
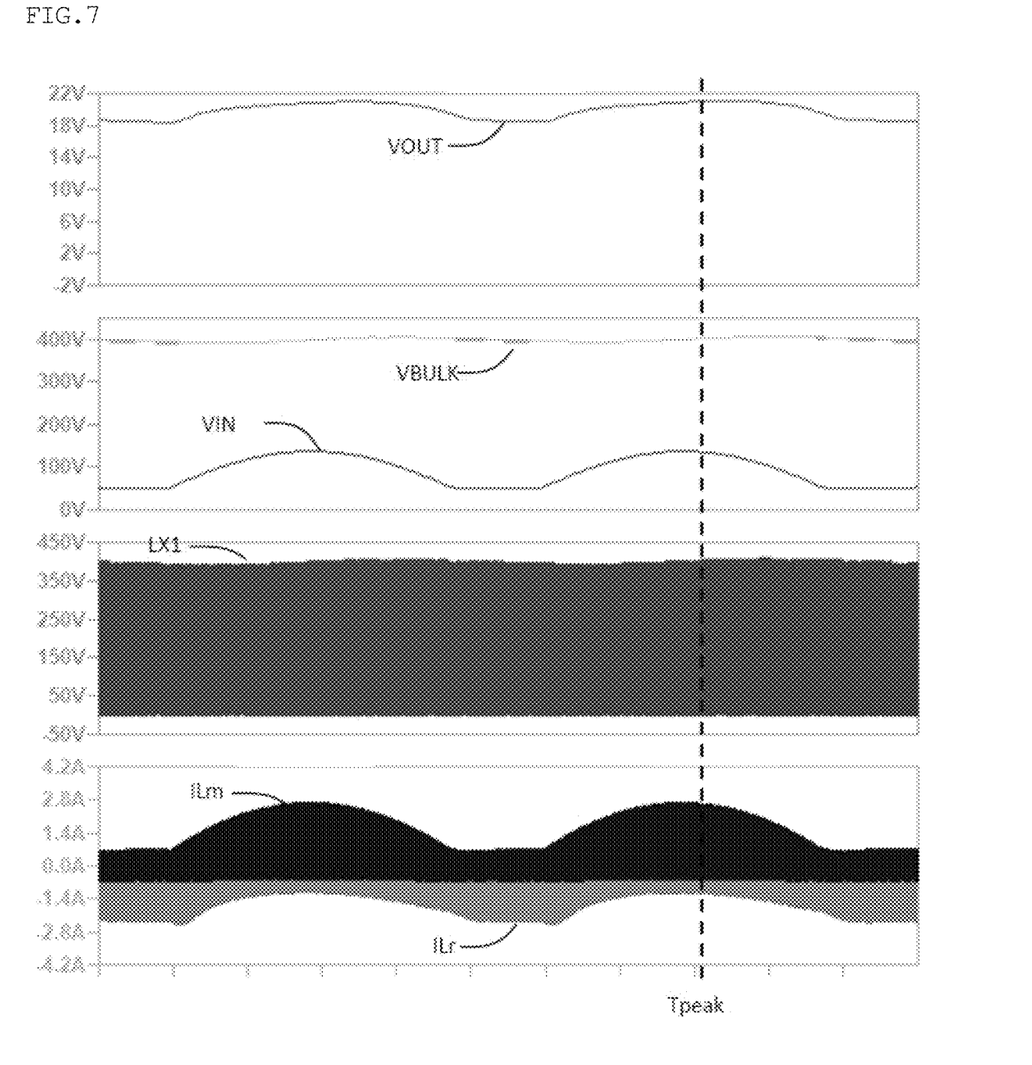
FIG. 7 shows an operating waveform diagram of Example 2 in the case of power factor correction operation.
Figure 8:
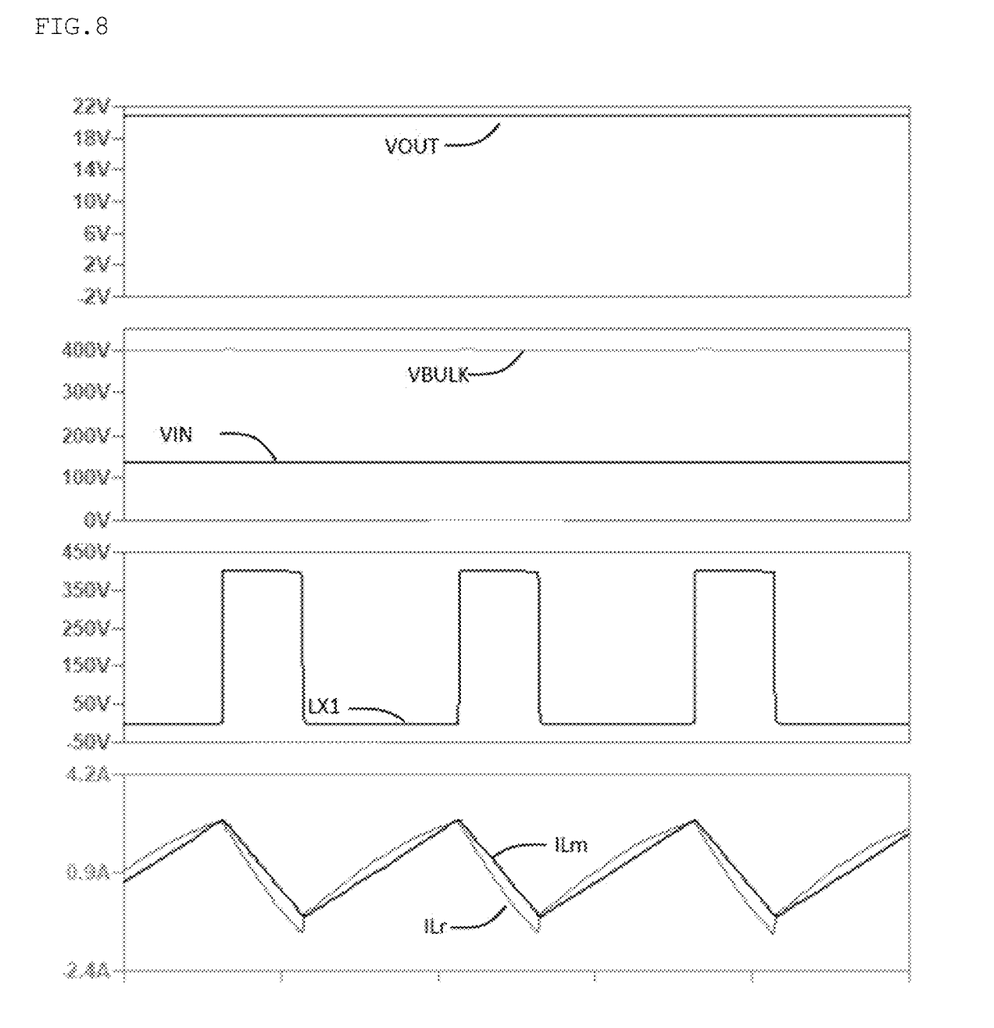
FIG. 8 shows an enlarged view in FIG. 7.

FIG. 7 shows operating waveforms during a power factor correction operation when the controller feedback circuit U2 in Example 2 has a power factor correction function based on fixed on-time control. Also, FIG. 8 shows an enlarged waveform at time Tpeak, as shown in FIG. 7.

As shown in FIG. 7, since the magnetizing current ILm varies with the input voltage VIN, the phase difference is small and the power factor is improved.

In a single-stage PFC based on a conventional flyback converter, it was necessary to increase the size of the output capacitor COUT1 in order to smooth out the ripples in the output voltage VOUT that occur at twice the commercial frequency. In the converter based on the present invention, the output voltage VOUT=boosted voltage VBULK×NS/NP, so smoothing the ripples in the output voltage VOUT corresponds to smoothing the ripples in the boosted voltage VBULK.

The ripples in the boosted voltage VBULK are smoothed by the boost capacitor CBULK1. For example, when configuring a single-stage PFC with the same output voltage VOUT=20V, and if the boost voltage VBULK is 400V, the capacitor energy is $(400V/20V)^2=400$ times compared to the single-stage PFC based on the conventional flyback converter. This means that in a converter based on the present invention, the boost capacitor CBULK1 for equally smoothing the ripples in the output voltage only needs to have a capacitance of 1/400 as compared to the conventional single-stage PFC.

Also, the capacitance of the input capacitor CIN1 is not restricted to a certain value if it is not a PFC, but in a PFC, the capacitance of the input capacitor CIN1 needs to be reduced within a range that does not affect the power factor.

When a flyback or active clamp flyback is used as a PFC (power factor correction circuit), the input voltage VIN increases because the input capacitor CIN1 cannot suppress surges such as ESD, owing to the small capacitance of the input capacitor CIN1. It is necessary to add surge countermeasure circuits and select devices with a breakdown voltage element that can withstand voltage surges, which increases cost and size.

In the converter based on the present invention, it is also necessary to reduce the capacitance of the input capacitor CIN1, but since an increase in the input voltage VIN due to a surge is clamped by the boost capacitor CBULK1 with large capacitance via the bypass diode DIN1, no countermeasure circuit is required and there is no need to increase the breakdown voltage element.

Therefore, when the present invention is applied to a PFC, both the downsizing of capacitors and the adjunction of surge suppression circuits are not necessary, and downsizing of the device becomes possible.

DESCRIPTION OF SYMBOLS

VACACF, VAC AC power supply
BDACF, BD1 Bridge diode
CINACF, CIN1 Input capacitor
U1ACF, U1 Control circuit
U2ACF, U2 Feedback circuit
Q1ACF, Q1 Drive switch
Q2ACF, Q2 Active clamp switch
Cr Resonant capacitor
TrACF, Tr Ideal transformer
LmACF, Lm Magnetizing inductor
LrACF, Lr Leakage inductor
T1ACF, T1 Transformer
DACF, D1, D2 Rectifier diode
COUT1ACF, COUT1, COUT2 Output capacitor
RLOAD1ACF, RLOAD1, RLOAD2 Load
VINACF, VIN Input voltage
VCr Resonant capacitor voltage
VOUTACF, VOUT Output voltage
LX1ACF, LX1 Primary side switch node voltage
LX2ACF, LX2 Secondary side switch node voltage
ILmACF, Ilm Magnetizing current
ILrACF, ILr Resonant current
ISecACF, ISec Secondary side rectifier
PGNDACF, PGND Primary side reference voltage
SGNDACF, SGND Secondary side reference voltage
S100, S200 Switching power supply circuit of the present invention
CBULK1 Boost capacitor
DIN1 Bypass diode
VGS1 Drive switch control signal
VGS2 Active clamp switch control signal
VBULK Boost voltage
CT1, CT11, CT12 Tank capacitor
VTANK Tank capacitor voltage
ICOUT1, ICOUT2 Output capacitor current
RFB1, RFB2 Feedback resistance
Q3, Q4 Synchronous rectifier switch
U3, U4 Synchronous rectifier switch control circuit
Vf Diode forward voltage
ZVS Zero voltage switching

REFERENCES

Patent Document

[Patent Document 1] JP 6643423 B

Non-Patent Document

[Non-patent Document 1] Hari, A., McCoy, B., "High-Density Ac-Dc Power Supplies using Active-Clamp Flyback Topology", Semiconductor Components Industries, L L C, 2019 October, 2021—Rev. 5 1 Publication Order Number: TND6279JP/D.

[Non-patent Document 2] Texas Instruments Inc., "Zero-Voltage-Switching Flyback Using UCC28780 Controller and UCC5304 Isolated Synchronous-Rectifier Driver", July 2020.

[Non-patent Document 3] Kali Naraharisetti, Janamejaya Channegowda, "Single Stage PFC Flyback AC-DC Converter Design", 2020 IEEE International Conference on Electronics, Computing and Communication Technologies, 2-4 Jul. 2020.

[Non-patent Document 4] Texas Instruments Inc., "UCC28780 High Frequency Active Clamp Flyback Controller", SLUSD 12A—OCTOBER 2017-REVISED, February 2018.

What is claimed is:

1. A switching power supply circuit comprising:
a transformer with a primary winding and a secondary winding,
a driver switch to drive the transformer,
an active clamp switch that clamps a primary side switch node when the driver switch is turned off, a bulk capacitor to discharge clamp energy,
a first rectifier,
a second rectifier,
a tank capacitor,
an output capacitor,
a feedback circuit that outputs a feedback signal in response to an output voltage, and
a control circuit that controls the driver switch and the active clamp switch based on the feedback signal; and
one of the driver switch and the active clamp switch connected to one of the positive and negative electrodes of the bulk capacitor, and another of the driver switch and the active clamp switch connected to another of the positive and negative electrodes of the bulk capacitor, so that the primary side switch node is clamped via the active clamp switch; and
one of the first rectifier and the second rectifier connected to one of the positive and negative electrodes of the output capacitor, and another of the first rectifier and the second rectifier connected to another of the positive and negative electrodes of the output capacitor, so that a secondary side switch node is clamped via the first rectifier or the second rectifier; and
one of the windings connected to the secondary side switch node and another connected to the tank capacitor, so that the output voltage is the bulk capacitor voltage times the number of turns of the secondary winding divided by the number of turns of the primary winding.

2. The switching power supply circuit according to claim 1, wherein the tank capacitor is a series tank capacitor composed of a first tank capacitor and a second tank capacitor connected in series, and a positive electrode of the series tank capacitor is connected to a positive electrode of the output capacitor, and a negative electrode of the series tank capacitor is connected to a negative electrode of the output capacitor, and a midpoint of the series tank capacitor is connected to an other side of the secondary winding.

3. The switching power supply circuit according to claim 1, wherein the control circuit controls the active clamp switch to be turned on until the driver switch charges enough energy in the transformer for ZVS.

4. The switching power supply circuit according to claim 2, wherein the control circuit controls the active clamp switch to be turned on until the driver switch charges enough energy in the transformer for ZVS.

5. The switching power supply circuit according to claim 1, wherein the feedback circuit monitors a voltage of the bulk capacitor having a voltage corresponding to the output voltage and transmits the voltage to the control circuit.

6. The switching power supply circuit according to claim 1, wherein the first rectifier and the second rectifier each include a respective transistor.

7. The switching power supply circuit according to claim 1, wherein the switching power supply circuit has a power factor correction function.

8. The switching power supply circuit according to claim 2, wherein the feedback circuit monitors a voltage of the bulk capacitor having a voltage corresponding to the output voltage and transmits the voltage to the control circuit.

9. The switching power supply circuit according to claim 2, wherein the first rectifier and the second rectifier each include a respective transistor.

10. The switching power supply circuit according to claim 2, wherein the switching power supply circuit has a power factor correction function.

11. The switching power supply circuit according to claim 3, wherein the feedback circuit monitors a voltage of the bulk capacitor having a voltage corresponding to the output voltage and transmits the voltage to the control circuit.

12. The switching power supply circuit according to claim 3, wherein the first rectifier and the second rectifier each include a respective transistor.

13. The switching power supply circuit according to claim 3, wherein the switching power supply circuit has a power factor correction function.

14. The switching power supply circuit according to claim 4, wherein the feedback circuit monitors a voltage of the bulk capacitor having a voltage corresponding to the output voltage and transmits the voltage to the control circuit.

15. The switching power supply circuit according to claim 4, wherein the first rectifier and the second rectifier each include a respective transistor.

16. The switching power supply circuit according to claim 4, wherein the switching power supply circuit has a power factor correction function.

* * * * *